US012408254B2

(12) United States Patent
Deuringer

(10) Patent No.: US 12,408,254 B2
(45) Date of Patent: Sep. 2, 2025

(54) X-RAY SOURCE WITH A GRID VOLTAGE UNIT

(71) Applicant: Siemens Healthineers AG, Forchheim (DE)

(72) Inventor: Josef Deuringer, Herzogenaurach (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 228 days.

(21) Appl. No.: 18/360,101

(22) Filed: Jul. 27, 2023

(65) Prior Publication Data

US 2024/0038477 A1 Feb. 1, 2024

(30) Foreign Application Priority Data

Jul. 28, 2022 (EP) .................................... 22187539

(51) Int. Cl.

| | |
|---|---|
| ***H05G 1/08*** | (2006.01) |
| ***H01J 35/04*** | (2006.01) |
| ***H05G 1/32*** | (2006.01) |
| ***H05G 1/46*** | (2006.01) |

(52) U.S. Cl.

CPC ........... *H05G 1/085* (2013.01); *H01J 35/045* (2013.01); *H01J 2235/068* (2013.01); *H05G 1/32* (2013.01); *H05G 1/46* (2013.01)

(58) Field of Classification Search

CPC .. H05G 1/085; H05G 1/32; H05G 1/46; H01J 35/045; H01J 2235/068

See application file for complete search history.

(56) References Cited

U.S. PATENT DOCUMENTS

| | | | | | |
|---|---|---|---|---|---|
| 4,274,005 | A * | 6/1981 | Yamamura | H05G 1/02 378/10 |
| 11,000,248 | B2 | 5/2021 | Gadenne et al. | |
| 2004/0264222 | A1* | 12/2004 | Beland | H05G 1/10 363/71 |
| 2009/0058319 | A1* | 3/2009 | Berk | H05G 1/46 315/291 |
| 2015/0084502 | A1 | 3/2015 | Deuringer et al. | |
| 2022/0406555 | A1 | 12/2022 | Behling et al. | |

FOREIGN PATENT DOCUMENTS

| | | | |
|---|---|---|---|
| DE | 2933831 | A1 | 4/1980 |
| DE | 102007042108 | A1 | 3/2009 |
| DE | 102013219173 | A1 | 3/2015 |
| EP | 3823002 | A1 | 5/2021 |

* cited by examiner

*Primary Examiner* — Chih-Cheng Kao

(74) *Attorney, Agent, or Firm* — Harness, Dickey & Pierce, P.L.C.

(57) ABSTRACT

One or more example embodiments relates to an X-ray source comprising a grid voltage unit including an interface configured to receive a control signal. The grid voltage unit is configured to regulate, via regulation of a first grid voltage at a first grid and via regulation of a second grid voltage at a second grid, a charge quantity available in a capacitor and a generator current as a function of the control signal.

20 Claims, 5 Drawing Sheets

X-RAY SOURCE WITH A GRID VOLTAGE UNIT

CROSS-REFERENCE TO RELATED APPLICATION(S)

The present application claims priority under 35 U.S.C. § 119 to European Patent Application No. 22187539.6, filed Jul. 28, 2022, the entire contents of which are incorporated herein by reference.

FIELD

One or more example embodiments relates to an X-ray source.

RELATED ART

A conventional X-ray source generates X-rays on the anode by means of electrons generated on the cathode side. Particular applications of X-rays frequently require fast regulation of the X-rays, whereby, for example, the X-rays are to be switched off and/or on immediately. A further application relates to the variation in the maximum energy of the X-rays, in order to be able to use, for example in the case of dual-energy image recording, the energy-dependent attenuation in the radiographed materials for material differentiation.

For fast switching, a conventional X-ray source has, for example, a grid, which can pass, focus or cut off the electron current (tube current) generated at the cathode as a function of the grid voltage. The fast switching of such a conventional X-ray source by means of the grid voltage frequently results in high voltage overshooting and/or high voltage undershooting, in particular if the clock period is less than 1 ms. The cause of this is typically that a conventional high voltage source, which these pulsed grid voltages can provide, cannot customarily react sufficiently quickly. In this application "pulsed" means, in particular, on and off. This is due, in particular, to the charge quantities, which are available in the power electronics of the high voltage source in provided or parasitic capacitors and can result in comparatively flat edges in grid voltage and/or currents due to the discharging or charging of the capacitors. It is frequently not possible therefore to synchronize the high voltage source with the grid voltage. Switching which is time-synchronous with the provided clock of the X-ray emission is thus not customarily possible because the previous switching times are relatively long.

DE 10 2007 042 108 A1 relates to an electron source comprising an electron emitter having an electron emitting cathode, a high voltage unit provided for supplying energy to the electron emitting cathode and a low voltage unit provided for actuating the high voltage unit. Data is not transmitted electrically, in particular optically, between the high voltage unit and the low voltage unit.

DE 10 2013 219 173 A1 describes a high voltage supply, which can be regulated quickly, for electrically focusing an electron beam with a high voltage output stage. The high voltage output stage has a plurality of intensifying elements, which are connected in series with a first high voltage terminal, a voltage divider chain with a series of voltage divider elements, which is connected to the first high voltage terminal and has a signal link to the intensifying elements, so when a voltage is applied across the voltage divider chain there is a difference in voltages between the signal input of one intensifying element and the signal input of the next intensifying element respectively with the same sign.

U.S. Pat. No. 11,000,248 B2 describes methods and systems for dual-energy imaging, wherein in one embodiment a method comprises the steps of controlling an X-ray source with a first voltage for generating X-rays in the case of a first energy, of controlling the same X-ray source with a second voltage for generating X-rays in the case of a second energy and of controlling a current of the X-ray source.

Previously implemented cable discharge switches have frequently been based on a series circuit of a large number of semiconductor switches. Owing to a limited cut-off voltage of the semiconductor switches, typically a large number of semiconductor switches, in particular transistors, including actuation, is necessary, which in turn results in a component with a large volume.

In the case of application of the X-rays to dual-energy image recording, in contrast to the previously described fast-switching (on and off), the grid voltage is switched back and forth in sync between two high voltage potentials. With dual-energy image recording of this kind, depending on the tube current and/or in the case of small tube currents, a time for the voltage drop is relatively high or a speed of a change in voltage is comparatively low. The period of the change over time in the high voltage is especially high in particular with low tube currents. A fast change in voltage is not possible therefore in particular with low tube currents. Preferably no X-rays are emitted by the conventional X-ray source in the period of a change in the high voltage over time since the X-ray dose applied by these X-rays emitted with varying maximum energy is not typically for advantageous for image recording and is thus irradiated unnecessarily. If these X-rays are irradiated nonetheless, however, they can result in an image impairment and/or in a patient dose without clinical benefit. If the image recording frequency is reduced, for example in accordance with the comparatively low speed of a change in voltage, in the case of an X-ray source rotating about the examination object this can result in a lower spatial sampling in the case of dual-energy-image recording.

EP 3 823 002 A1 discloses a rotary anode X-ray source. In addition to a primary cathode of a rotary anode X-ray tube, an auxiliary cathode is provided in the rotary anode X-ray tube. Electrons of the auxiliary anode are focused onto an anode region for generating such X-rays which do not intersect the usable X-ray generated at the primary cathode.

SUMMARY

One or more example embodiments provides an X-ray source for fast switching of the X-ray radiation.

The object is achieved by the features of the independent claims. Advantageous embodiments are described in the subclaims.

An inventive X-ray source has
- a cathode facility for emitting electrons,
- a first anode region,
- a second anode region,
- at least one high voltage cable and
- a high voltage source for providing a high voltage in the high voltage cable for the acceleration of the electrons, wherein the high voltage cable connects the high voltage source and the cathode facility to the high voltage for the supply,
- wherein the high voltage is greater than 10 kV and the high voltage source together with the high voltage cable forms a capacitor for providing a generator current, wherein the cathode facility has a first grid-switched cathode with a first grid for generating a first current of emitted electrons as a function of a first grid voltage lying at high voltage potential and a second grid-switched cathode with a second grid for generating a second current of emitted electrons as a function of a second grid voltage lying at high voltage potential, characterized by a grid voltage unit, which has an interface for receiving a control signal and is embodied to regulate, by way of regulation of the first grid voltage at the first grid and by way of regulation of the second grid voltage at the second grid, the charge quantity available in the capacitor and thus the generator current as a function of the control signal.

According to one embodiment, the first grid-switched cathode is configured to generate, by means of the first electron current which can be generated, first X-rays in a first anode region of the X-ray source for radiographing an object, wherein the second grid-switched cathode is configured to generate, by means of the second electron current which can be generated, second X-rays in a second anode region of the X-ray source, wherein the first anode region and the second anode region are disjunct and wherein the second anode region is oriented onto an X-ray shield in such a way that the object to be radiographed is shielded from the second X-rays.

According to one embodiment, the first anode region is part of a first anode and the second anode region is part of a second anode, wherein the first anode and the second anode are thermally decoupled.

According to one embodiment, the first anode and the first grid-controlled cathodes are arranged inside a first evacuated X-ray tube housing of the X-ray source, wherein the second anode and the second grid-controlled cathode are arranged inside a second evacuated X-ray tube housing of the X-ray source and wherein the vacuum of the first X-ray tube housing and the vacuum of the second X-ray tube housing are separated from each other.

According to one embodiment, the second X-ray tube housing comprises a radio frequency intensifier tube or a thermal capacity-optimized stationary anode tube.

According to one embodiment, the grid voltage unit has a grid voltage source for generating the grid voltages and a grid voltage switch, wherein the grid voltage switch is embodied to transfer the grid voltages between the first grid and the second grid by switching the grid voltage switch.

According to one embodiment, the grid voltage unit has a first grid voltage source for generating the first grid voltage which can be applied at the first grid and a second grid voltage source for generating the second grid voltage which can be applied at the second grid, so the first grid voltage can be regulated independently of the second grid voltage.

According to one embodiment, the second grid-switched cathode is embodied for expanding the second electron current as a function of the second grid voltage.

According to one embodiment, the grid voltage unit is embodied to ascertain the amplitude of the second electron current and to regulate the first grid voltage and the second grid voltage as a function of the ascertained amplitude.

According to one embodiment, the grid voltage unit is embodied to regulate the first grid voltage and the second grid voltage as a function of a change over time in the high voltage.

According to one embodiment, the grid voltage unit is embodied to regulate the first grid voltage and the second grid voltage in order to prevent an overshooting or an undershooting in the case of the high voltage in that the generator current is kept substantially constant.

According to one embodiment, the grid voltage unit is embodied to regulate the first grid voltage and the second grid voltage in order to provide rectangular pulses of the first electron current and/or the second electron current.

According to one embodiment, the grid voltage unit is embodied to regulate the first grid voltage and the second grid voltage in a clock period less than 1 ms, preferably less than 200 μs.

One advantage of the X-ray source is that, in particular, the high voltage source sees a constant load and thus the inertia when the high voltage and/or the tube current changes can be overcome by means of the high voltage source.

BRIEF DESCRIPTION OF THE DRAWINGS

The invention will be described and explained in more detail below on the basis of the exemplary embodiments represented in the Figures. Basically, structures and units which remain substantially the same will be labelled with the same reference characters in the following description of the figures as on the first occurrence of the respective structure or unit.

In the drawings.

DETAILED DESCRIPTION

Figure 1:
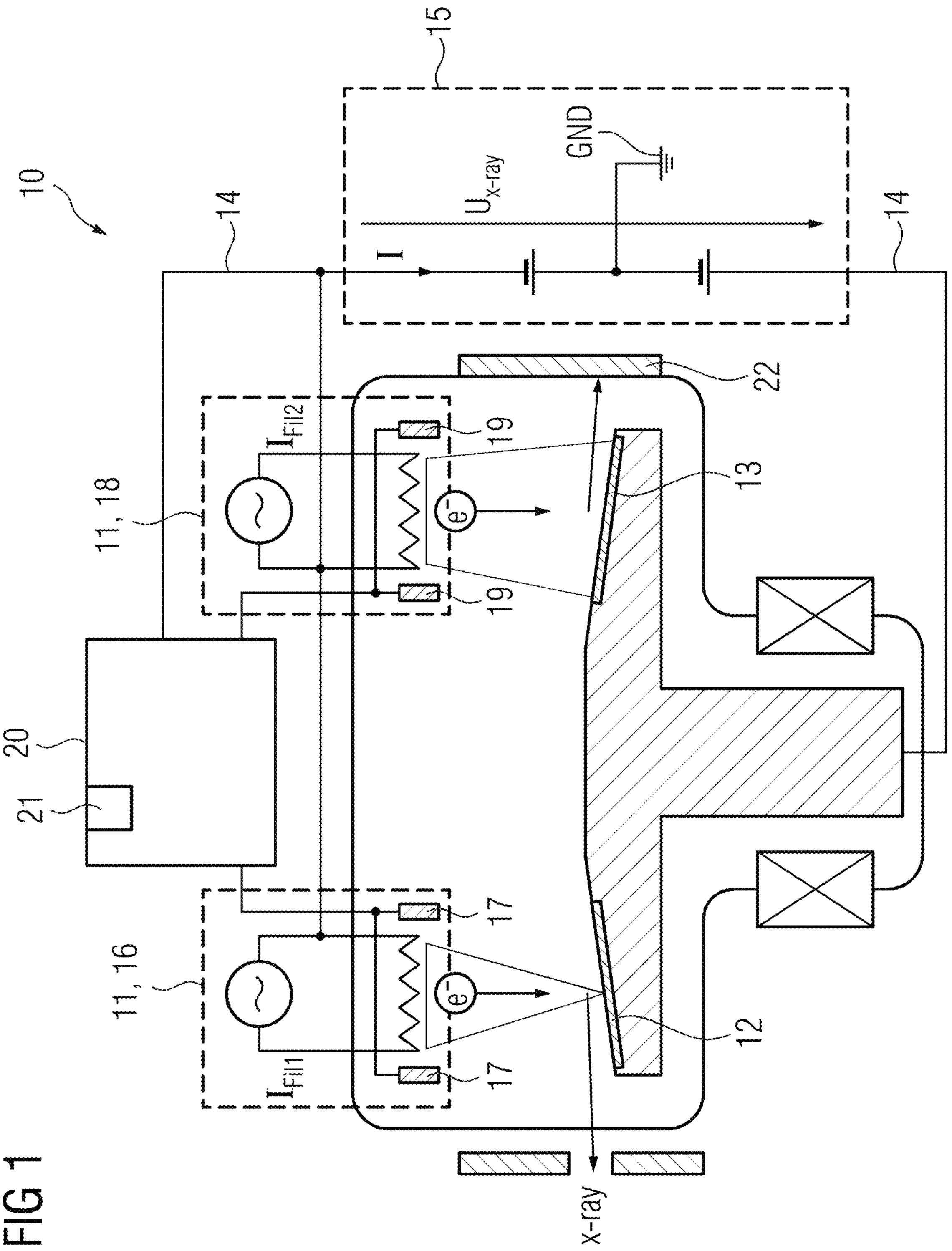
FIG. 1 shows an inventive X-ray source.

FIG. 1 shows an inventive X-ray source 10.

The X-ray source 10 has a cathode facility 11 for emitting electrons, a first anode region 12, a second anode region 13, at least one high voltage cable 14 and a high voltage source 15 for providing a high voltage Ux-ray in the high voltage cable 14 for the acceleration of the electrons e−.

The X-ray source 10 is provided for an image-generating examination of an object. The object can be a material and/or a patient. The image-generating examination can be angiography, computed tomography and/or radiography. Alternatively or in addition, the image-generating examination can be materials testing and/or a customs inspection.

The X-ray source 10 provides, in particular, X-rays with a maximum energy of more than 10 keV and/or less than 200 keV. The maximum energy depends, in particular, on the acceleration voltage Ux-ray between the cathode facility 11 and the first anode region 12 or the second anode region 13. The acceleration voltage Ux-ray correlates, in particular, with the high voltage. The acceleration voltage Ux-ray corresponds, in particular, with the high voltage when the X-ray source 10 is embodied with a single pole. With a two-pole embodiment of the X-ray source 10 and a symmetrical high voltage source the maximum energy is customarily twice the amount of the high voltage. Customary acceleration voltages Ux-ray are in a range between 40 kV and 150 kV, for example 70 kV, 80 kV and/or 120 kV.

The high voltage source 15 is embodied for providing the high voltage. The high voltage source 15 provides the high voltage, in particular in the high voltage cable, for the acceleration of the electrons e−.

The high voltage cable 14 connects the high voltage source 15 and the cathode facility 11. The high voltage cable 14 is, in particular, detachably linked to the cathode facility 11. The high voltage source 15 can be connected to the cathode facility 11 with the high voltage by way of the connection to the high voltage cable 14. The high voltage is greater than 10 kV.

The high voltage source 15 together with the high voltage cable 14 forms a capacitor and is embodied for providing the generator current. The capacitor contains, in particular, a charge quantity, which can vary over time. The flow of current (amplitude and time) of the generator current thereby corresponds to a change in the charge quantity. The capacitor thus stores a certain electrical current, which frequently varies during operation of the X-ray source. A maximum charge quantity depends, in particular, on the geometric construction of the high voltage cable 14, in particular on the conductor cross-section and/or the conductor length.

The cathode facility 11 has a first grid-switched cathode 16 and a second grid-switched cathode 18. The first cathode 16 has a first grid 17 and is embodied for generating a first current of emitted electrons as a function of a first grid voltage UG1 lying at high voltage potential. The second cathode 18 has a second grid 19 and is embodied for generating a second current of emitted electrons as a function of a second grid voltage UG2 lying at high voltage potential. The first current of emitted electrons can be referred to as the first tube current and/or the second current of emitted electrons as the second tube current.

The first cathode 16 has a first electron emitter. The second cathode 18 has a second electron emitter. In FIG. 1 the first electron emitter is a thermionic emitter and the second electron emitter is likewise a thermionic emitter. Both cathodes 16, 18 have a heating current source for heating the two thermionic emitters, with the electrons e− being emitted. The first electron emitter and the second electron emitter are operated with one separate heating current source respectively. Alternatively, a series circuit is also possible. Alternatively, the first electron emitter and the second electron emitter can be connected in parallel.

A development of the embodiment shown in FIG. 1 relates to the embodiment of the electron emitter. One or both of the electron emitter(s) can basically be embodied as a field effect emitter. The emission of electrons with a field effect emitter is typically effected by applying a gate voltage, which by way of the electrical field occurring in the tips of the nanotubes extracts the electrons e− from these nanotubes, whereby the electron current is formed. In addition to switching by means of the gate voltage, a generated electron current can be cut off by means of the first grid 17 and/or the second grid 19. The field effect emitter typically has a large number of nanotubes, for example made of carbon or silicon or molybdenum. It is basically conceivable that the first cathode 16 and the second cathode 18 have the same construction. Alternatively, the first cathode 16 can differ from the second cathode 18 in type of electron emitter and/or in a maximum current of the electron emitter.

The first grid 17 and/or the second grid 19 is an electrode, which enables the emitted electron current to be controlled. The electrode can have a grid-like structure. Alternatively, the electrode be formed by one focusing head each in which the first cathode 16 and the second cathode 18 respectively are inserted. The first grid 17 and/or the second grid 19 can be negatively or positively charged in respect of the electric potential of the electron emitter by the applied first grid voltage UG1 or by the applied second grid voltage UG2. If the electric potential of a grid 17, 19 lies between the electric potential of the electron emitter and the electric potential of the anode region 12, 13, the grid 17, 19 tends to be permeable as if the electric potential of the grid 17, 19 is more negative and thus cuts off the electron current. The first grid voltage UG1 and the second grid voltage UG2 fluctuates, in particular, around the potential of the high voltage by 1 to 6 kV. If the first grid voltage UG1 and/or the second grid voltage UG2 is less than 1 kV, for example 200 to 500 V, the corresponding grid 17, 19 focuses or defocuses the respective emitted electron current.

Focusing means, in particular, a reduction of the focal spot. Defocusing means, in particular, an enlargement of the focal spot. Focusing or defocusing can take place, in particular, by way of the geometric embodiment of the respective cathode 16, 18, in particular by way of the geometric embodiment of the focusing head, in combination with the switching on or off of the grid voltages UG1, UG2 respectively.

The X-ray source 10 also has a grid voltage unit 20. The grid voltage unit 20 has an interface 21 for receiving a control signal. The grid voltage unit 20 is embodied to regulate, by way of regulation of the first grid voltage UG1 at the first grid 17 and by way of regulation of the second grid voltage UG2 at the second grid 19, the charge quantity available in the capacitor and thus the generator current as a function of the control signal.

Regulating the charge quantity or the generator current means, in particular, that the X-ray source 10 is operated in such a way that the charge quantity or the generator current is not built up or broken down in an uncontrolled manner. Regulating the charge quantity or the generator current comprises breaking down the charge quantity in the capacitor by increasing the first electron current and/or the second electron current by taking into consideration the charge quantity to be broken down, and this typically changes in accordance with the generator current. Regulating the charge quantity or the generator current comprises building up the charge quantity in the capacitor by reducing the first electron current and/or the second electron current by taking into consideration the charge quantity to be built up. The first electron current and/or the second electron current is/are increased or reduced, in particular, by corresponding regulation of the first grid voltage UG1 or the second grid voltage UG2.

The interface 21 can be cabled or cable-less. The control signal can be analog or digital. The interface 21 can be embodied for receiving the analog control signal or the digital control signal. In addition, the interface 21 can be embodied for returning status signals and/or measured values.

The control signal depends, in particular, on the type of application of the X-rays and/or on the image-generating examination. The control signal can be defined, in particular, in a protocol in accordance with the application of the X-rays and/or in a protocol of the image-generating examination.

The control signal comprises, in particular, an actual value or a desired value. The control signal can comprise just one actual value or a plurality of actual values of different types and/or a plurality of past actual values. The control signal can comprise just one next desired value or a plurality of desired values of different types and/or comprise a plurality of future desired values. The control signal describes, in particular, the acceleration voltage Ux-ray, the high voltage, the first electron current, the second electron current, the first grid voltage UG1, the second grid voltage UG2, a heating current and/or a combination of said values. The control signal can typically vary over time.

The grid voltage unit 20 can comprise a logic unit, which is embodied for processing the control signal. Processing of the control signal can comprise calculating at least one further actual value and/or desired value and/or regulating the first grid voltage UG1 at the first grid 17 and by regulating the second grid voltage UG2 at the second grid 19. The control signal is typically processed repeatedly by implementing the processing steps in program code means. The logic unit can implement the program code means, in particular.

By way of example, in accordance with the control signal the grid voltage unit 10 can be configured in such a way that with fast switching of the X-rays, the high voltage source 15 sees the same or a constant load. In other words, the high voltage power provided by the high voltage source 15 is partially or completely distributed directly between the two cathodes 16 and 18 in this case. When the X-ray source is operated in another way, in particular with a reduction of the high voltage, wherein comparatively large charge quantities are built up in the high voltage source of a customary X-ray source, the second cathode 18 can absorb the additional charge quantities or some of the generator current and break them/it down in the form of the second electron current.

Basically, it is conceivable that an inventive principle can also be applied to more than two grid-controlled cathodes and thus also more than two electron emitters. By way of example, the cathode facility can have three grid-controlled cathodes, of which two cathodes are embodied for generating a first current of emitted electrons and a second current of emitted electrons, it being possible for the first current to be higher than the second current. These two cathodes can typically be changed over between high and low current and can carry no current respectively if, for example, the third cathode assumes current. Furthermore, when the currents change over at both of said cathodes, the third cathode can advantageously assume a current such that the generator current is kept substantially constant.

The grid voltage unit 20 is preferably embodied to regulate the first grid voltage UG1 and the second grid voltage UG2 in a clock period less than 1 ms, preferably less than 200 μs.

The exemplary embodiment in FIG. 1 also shows that the first grid-switched cathode 16 is configured to generate, by means of the first electron current which can be generated, first X-rays in the first anode region 12 of the X-ray source 10 for radiographing an object. The second grid-switched cathode 18 is configured to generate, by means of the second electron current which can be generated, second X-rays in the second anode region 13 of the X-ray source 10.

The first anode region 12 and the second anode region 13 are disjunct. The first anode region 12 and the second anode region 13 differ, in particular, and do not overlap. The second anode region 12 is oriented onto an X-ray shield 22 in such a way that the object to be radiographed is shielded from the second X-rays. The X-ray shield 22 features, for example, lead.

The first anode region 12 and/or the second anode region 13 is spatially defined, in particular, by the first electron current or the second electron current. In the first anode region 12 the first electron current forms a first focal spot in which the X-rays can be generated. The second electron current forms the second anode region 13 in which the X-rays can be generated. In other words, the cathode facility 11, in particular the first cathode 16 and/or the second cathode 18, determines at which position and/or with which surface the first electron current or the second electron current impinges on an anode, whereby the first anode region 12 and the second anode region 13 are spatially defined. If the anode is, for example, a stationary anode, the first anode region 12 and the second anode region 13 are fixed relative to the cathode facility 11 and to the anode, in particular as long as the electron currents are not changed by the cathode facility 11. If the anode is, for example, a rotating anode, the first anode region 12 and the second anode region 13 are fixed relative to the cathode facility 11, but not relative to the anode because, due to the rotation of the anode, the first anode region 12 and the second anode region 13 move synchronously with the rotation. A circular focal path thus forms on the anode.

The front of the anode features, in particular in the region of the first anode region 12 and/or the second anode region 13 or the focal path, tungsten and/or molybdenum. On the back the anode features, by way of example, graphite for cooling the front. FIG. 1 shows a rotating anode, which has an anode plate. The anode plate conventionally has an anode angle greater than 0°. The back of the anode remote from the cathode facility 11 can have a structure enlarging the surface.

Figure 2:
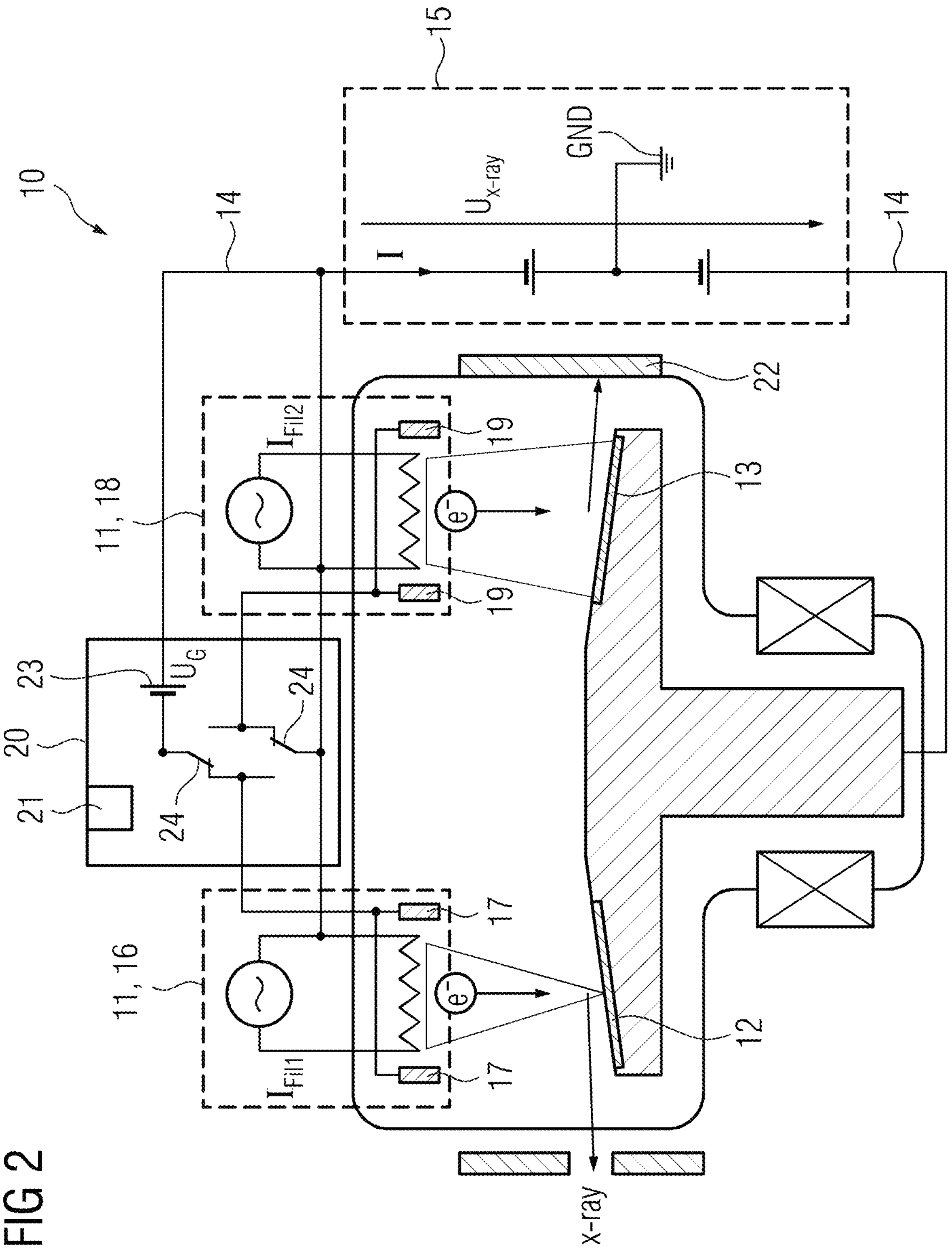
FIG. 2 shows a first exemplary embodiment of the X-ray source.

FIG. 2 shows a first exemplary embodiment of the X-ray source 10.

The grid voltage unit 20 has a grid voltage source 23 for generating the grid voltages UG, UG1, UG2 and a grid voltage switch 24. The grid voltage switch 24 is embodied to transfer the grid voltages UG, UG1, UG2 between the first grid 17 and the second grid 19 by switching the grid voltage switch 24. In this case, the first grid voltage UG1 can be regulated dependent on the second grid voltage UG2. In other words, the first grid voltage UG1 and the second grid voltage UG2 is switched back and forth, so ultimately the same potential difference can be applied at the respective grid 17, 19. The respective grid 17, 19 can thus only perform the same function, for example cutting off or focusing, alternately.

As an alternative to the exemplary embodiment shown in FIG. 2, the grid voltage unit 20 can have a first grid voltage source for generating the first grid voltage UG1 which can be applied at the first grid 17 and a second grid voltage source for generating the second grid voltage UG2 which can be applied at the second grid 19, so the first grid voltage UG1 can be regulated independently of the second grid voltage UG2. In other words, this embodiment overcomes the previously described limitation because various potential differences can be applied at the respective grid 17, 19, so the first electron current can be focused but the second electron current can be defocused or expanded. This development is advantageous, in particular, therefore because the second grid-switched cathode 18 can consequently be embodied for an expansion of the second electron current as a function of the second grid voltage UG2 in order to reduce the thermal load due to the second electron current in the second anode region.

Figure 3:
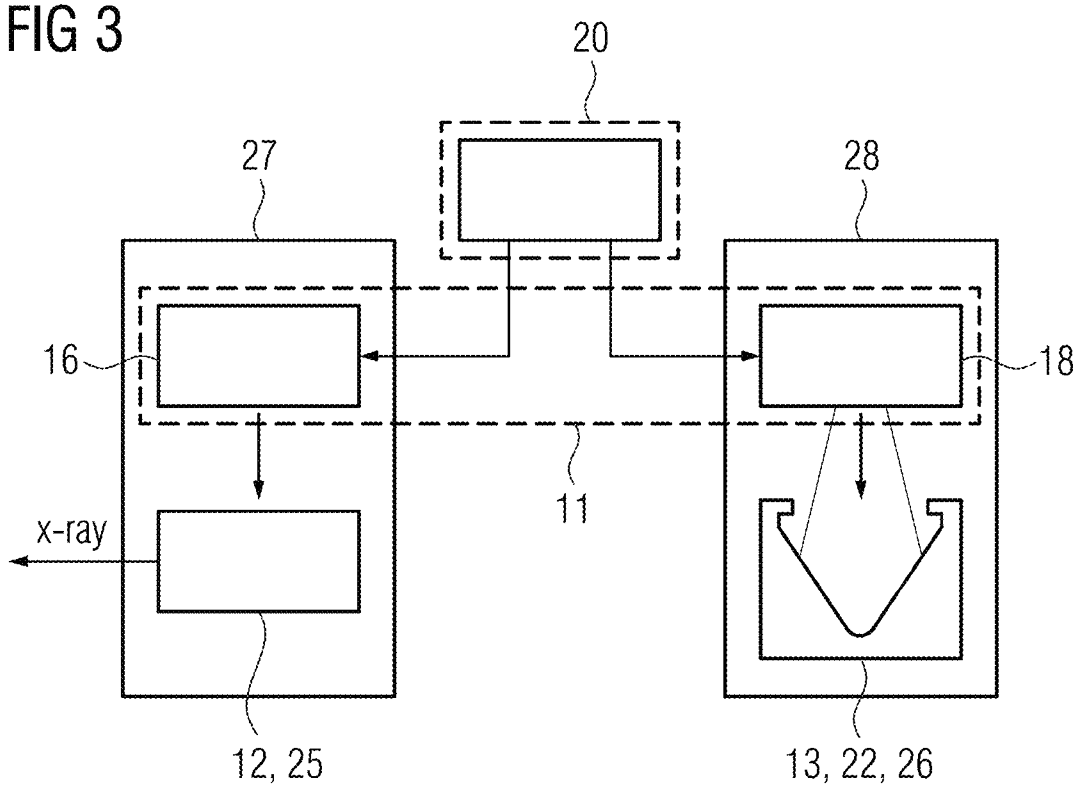
FIG. 3 shows a second exemplary embodiment of the X-ray source.

FIG. 3 shows a second exemplary embodiment of the X-ray source 10 in a schematic view.

In particular, the differences from the exemplary embodiment shown in FIG. 1 and FIG. 2 will be discussed below: The first anode region 12 is part of a first anode 25. The second anode region 13 is part of a second anode 26. The first anode 25 and the second anode 26 are thermally decoupled. The thermal decoupling can advantageously reduce the thermal load of the anode with the X-ray radiation for radiographing the object, while the thermal coupling of the two anode regions 12, 13 in FIG. 1 and FIG. 2 means all of the dissipated heat is absorbed in the same anode. The second anode 26 has a sleeve-like construction in this exemplary embodiment and thus forms the X-ray shield 22 itself.

FIG. 3 also shows that the first anode 25 and the first grid-controlled cathode 16 are arranged inside a first evacuated X-ray tube housing 27 of the X-ray source 10. The second anode 26 and the second grid-controlled cathode 18 are arranged inside a second evacuated X-ray tube housing 28 of the X-ray source 10. The vacuum of the first X-ray tube housing 27 and the vacuum of the second X-ray tube housing 28 are separated from each other. A development of this kind is advantageous, in particular, because the second X-ray tube housing 28 can consequently be installed so as to be spatially separated from the first X-ray tube housing 27. For example, the second X-ray tube housing 28 can be provided as a component of the power electronics of the high voltage source 15. The first X-ray tube housing 27 can thus turn out to be smaller if only the first anode 25, and not the second anode 26 as well, is installed. The second X-ray tube housing 28 particularly advantageously comprises a radio frequency intensifier tube or a thermal capacity-optimized stationary anode tube.

FIGS. 4 to 7 show the behavior of the X-ray source 10 depending on regulation by the grid voltage unit 20. The behavior is illustrated using four characteristic variables, of the amplitude of the usable X-rays x-ray, with which the object can be radiographed. x-ray does not include those X-rays, which can be generated by means of the second cathode 18. I1 denotes the amplitude of the first electron current, which issues from the first cathode 16 and from which the usable X-rays x-ray can be generated in the first anode region 12. I2 denotes the amplitude of the second electron current, which issues from the second cathode 18 and from which the X-rays to be absorbed in the X-ray shield 22 can be generated in the second anode region 13. The generator current substantially corresponds to the total of I1 and I2. Ux-ray denotes the amount of the acceleration voltage, which, as already stated, depends on the high voltage.

All of the FIGS. 4 to 7 shown represent the fact that the grid voltage unit 20 is inventively embodied to regulate the first grid voltage UG1 and the second grid voltage UG2 in order to provide rectangular pulses of the first electron current and/or the second electron current.

Figure 4:
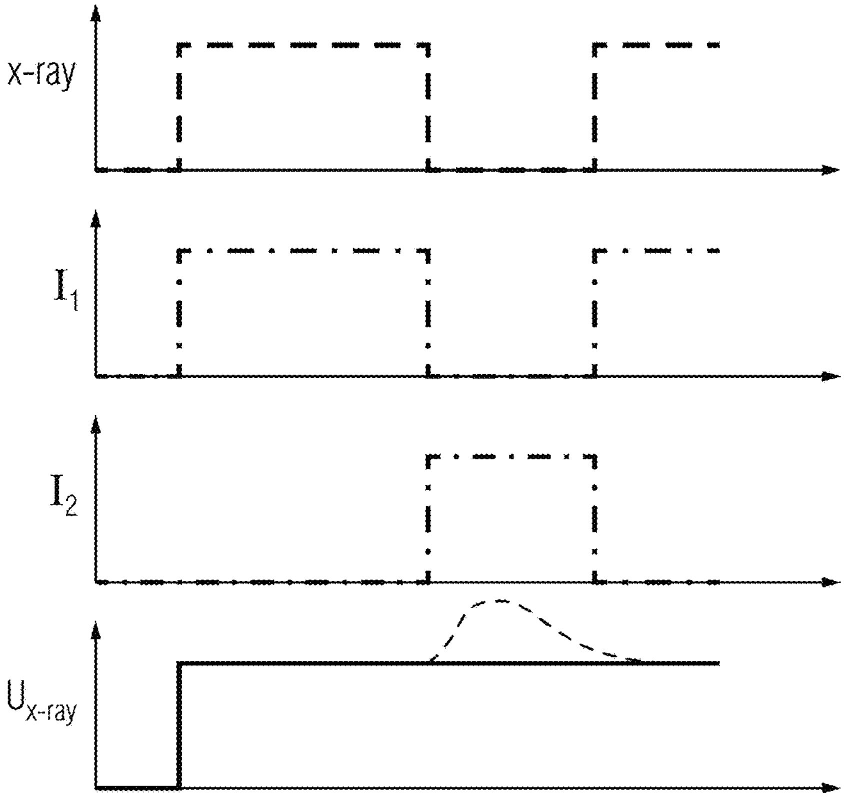
FIG. 4 to FIG. 7 show the different exemplary behavior of the X-ray source according to regulation.

FIG. 4 shows the exemplary behavior of the X-ray source 10 when the grid voltage unit 20 is embodied to regulate the first grid voltage UG1 and the second grid voltage UG2 in order to prevent overshooting or undershooting in the case of the high voltage in that the generator current is kept substantially constant. From this it follows that the acceleration voltage Ux-ray can likewise be kept constant. Regulation of the first grid voltage UG1 and the second grid voltage UG2 means the first electron current I1 can be switched off without overshooting of the high voltage. The X-ray source 10 can preferably be operated in a fast-switched or pulsed manner therefore. The X-ray source 10 therefore enables, in particular, what is known as digital dose modulation, which manages without what is known as analog changing of the high voltage provided by the high voltage source 15. A further advantage relates to the actuation of the electron emitter, which, in particular with an embodiment as a thermionic emitter, cannot be switched off quickly enough and instead can require several 100 ms for this. The X-rays can therefore be inventively controlled independently of the inertia of the electron emitters.

Indicated in FIG. 4 by means of a Ux-ray-overlaying broken line is the behavior of a customary X-ray source 10 in which, without the inventive regulating of the grid voltages UG1, UG2, the high voltage overshoots when the X-ray radiation is switched off.

Figure 5:
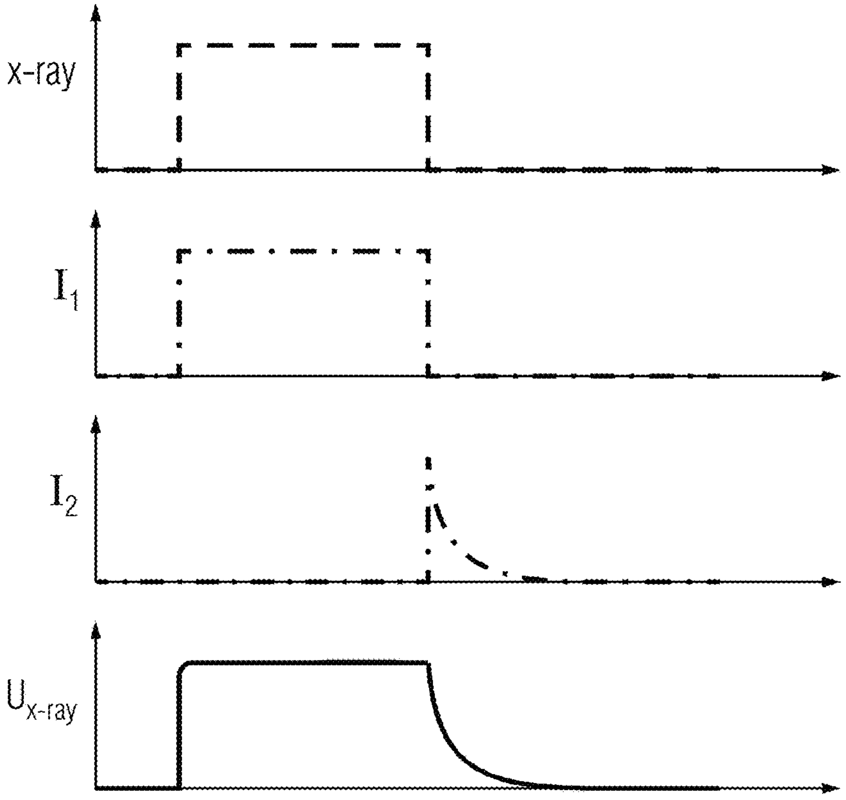

FIG. 5 shows the exemplary behavior of the X-ray source 10 when the X-rays and the high voltage are switched off. The charge quantity available in the capacitor is discharged by means of the second cathode 18 and the second electron current I2 generated therein. Without the discharging of the high voltage circuit the high voltage would be broken down only comparatively slowly in a customary grid-controlled X-ray source. A fast X-ray pulse sequence with different high voltages is not possible thereby in accordance with the prior art.

Figure 6:
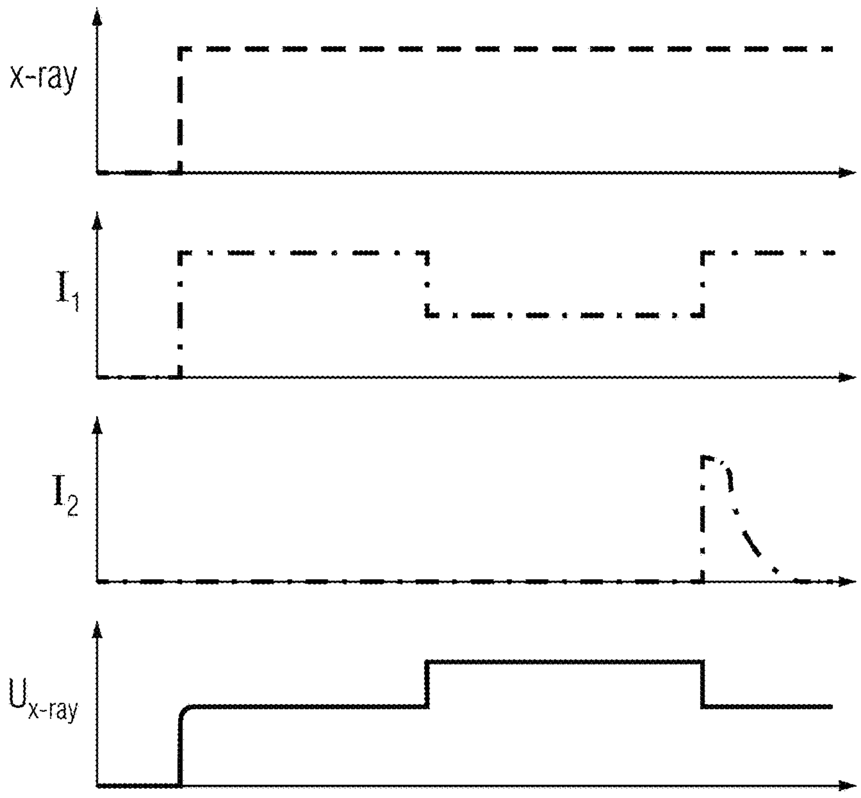

FIG. 6 shows the exemplary behavior of X-ray source 10 when the grid voltage unit 20 is embodied to ascertain the amplitude of the second electron current and to regulate the first grid voltage UG1 and the second grid voltage UG2 as a function of the ascertained amplitude. In this case, the X-rays are constantly regulated in that excess charge quantities of the capacitor are broken down by means of the second electron current I2.

Furthermore, FIG. 6 shows that the grid voltage unit 20 is embodied to regulate the first grid voltage UG1 and the second grid voltage UG2 as a function of a change over time in the high voltage.

Figure 7:
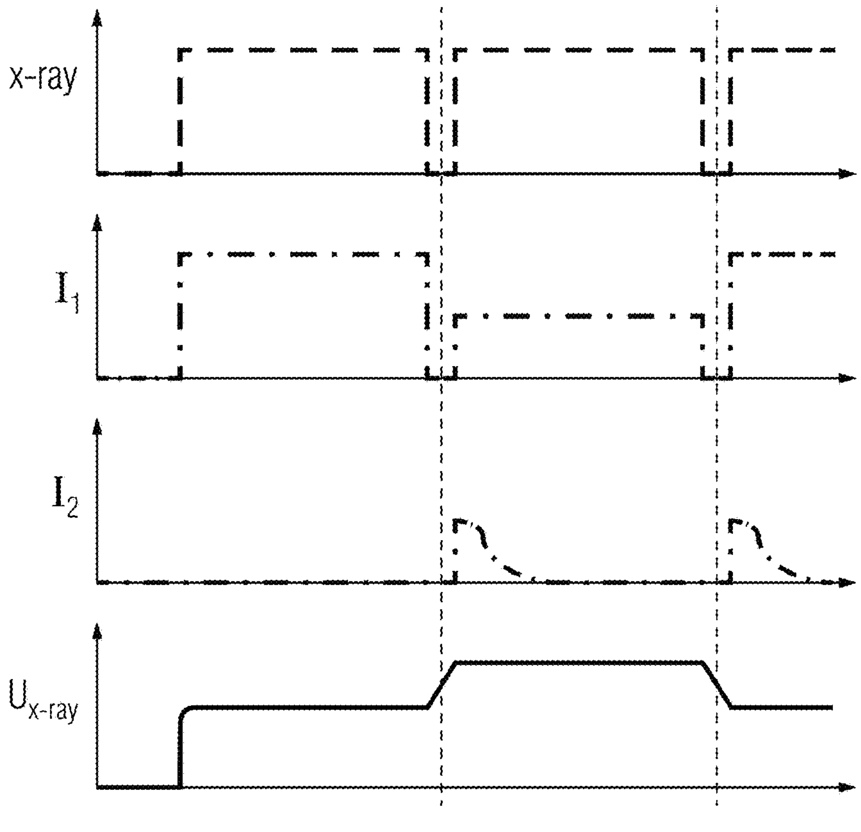

FIG. 7 shows a development of the exemplary embodiment shown in FIG. 6. The first grid voltage UG1 and the second grid voltage UG2 are regulated in such a way that as the flanks of the high voltage, and thus the acceleration voltage Ux-ray, rise or fall the first electron current I1, and thus the X-rays x-ray, is/are completely cut off.

The grid voltage unit 20 can analogously regulate the first grid voltage UG1 and the second grid voltage UG2 in such a way that the first electron current I1, and thus the X-rays x-ray, is/are completely cut off during setting of a focus of the first electron current and/or the second electron current.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term “and/or,” includes any and all combinations of one or more of the associated listed items. The phrase “at least one of” has the same meaning as “and/or”.

Spatially relative terms, such as “beneath,” “below,” “lower,” “under,” “above,” “upper,” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below,” “beneath,” or “under,” other elements or features would then be oriented “above” the other elements or features. Thus, the example terms “below” and “under” may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices (e.g., a terminal) may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', the term 'interface' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a terminal including a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device (e.g., a terminal), may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although the invention has been illustrated and described in detail by the preferred exemplary embodiments it is nevertheless not limited by the disclosed examples and a person skilled in the art can derive other variations herefrom without departing from the scope of the invention.

The invention claimed is:

1. An X-ray source, comprising:

a cathode facility configured to emit electrons, the cathode facility including:

a first grid-switched cathode with a first grid configured to generate a first current of emitted electrons as a function of a first grid voltage, and a second grid-switched cathode with a second grid configured to generate a second current of emitted electrons as a function of a second grid voltage;

a first anode region;
a second anode region;
at least one high voltage cable;
a high voltage source configured to provide a high voltage in the high voltage cable for acceleration of the electrons, the high voltage cable connects the high voltage source and the cathode facility,
the high voltage is greater than 10 kV, the high voltage source and the high voltage cable forming a capacitor configured to provide a generator current; and
a grid voltage unit including an interface configured to receive a control signal, the grid voltage unit configured to regulate, via regulation of the first grid voltage at the first grid and via regulation of the second grid voltage at the second grid, a charge quantity available in the capacitor and the generator current as a function of the control signal.

2. The X-ray source of claim 1, wherein
the first grid-switched cathode is configured to generate first X-rays in the first anode region of the X-ray source for radiographing an object,
the second grid-switched cathode is configured to generate second X-rays in the second anode region of the X-ray source,
the first anode region and the second anode region are disjunct, and
the second anode region is oriented onto an X-ray shield in such a way that the object to be radiographed is shielded from the second X-rays.

3. The X-ray source of claim 1, wherein
the first anode region is part of a first anode and the second anode region is part of a second anode, and
the first anode and the second anode are thermally decoupled.

4. The X-ray source of claim 3, wherein
the first anode and the first grid-switched cathode are arranged inside a first evacuated X-ray tube housing of the X-ray source,
the second anode and the second grid-switched cathode are arranged inside a second evacuated X-ray tube housing of the X-ray source, and
a vacuum of the first evacuated X-ray tube housing and a vacuum of the second evacuated X-ray tube housing are separated from each other.

5. The X-ray source as claimed in claim 4, wherein the second X-ray tube housing comprises:
a radio frequency intensifier tube or a thermal capacity-optimized stationary anode tube.

6. The X-ray source of claim 1, wherein
the grid voltage unit has a grid voltage source for generating the first grid voltage and the second grid voltage and a grid voltage switch, and
the grid voltage switch is embodied to transfer the grid voltages between the first grid and the second grid by switching the grid voltage switch.

7. The X-ray source of claim 1, wherein the grid voltage unit comprises:
a first grid voltage source configured to generate the first grid voltage; and
a second grid voltage source configured to generate the second grid voltage such that the first grid voltage is regulated independently of the second grid voltage.

8. The X-ray source as claimed in claim 7, wherein the second grid-switched cathode is configured to expand the second current of emitted electrons as a function of the second grid voltage.

9. The X-ray source of claim 1, wherein the grid voltage unit is configured to ascertain an amplitude of the second current of emitted electrons and to regulate the first grid voltage and the second grid voltage as a function of the ascertained amplitude.

10. The X-ray source of claim 1, wherein the grid voltage unit is configured to regulate the first grid voltage and the second grid voltage as a function of a change over time in the high voltage.

11. The X-ray source of claim 1, wherein the grid voltage unit is configured to regulate the first grid voltage and the second grid voltage such that the generator current is substantially constant.

12. The X-ray source of claim 1, wherein the grid voltage unit is configured to regulate the first grid voltage and the second grid voltage to provide rectangular pulses of at least one of the first current of emitted electrons or the second current of emitted electrons.

13. The X-ray source of claim 1, wherein the grid voltage unit is configured to regulate the first grid voltage and the second grid voltage in a clock period less than 1 ms.

14. The X-ray source of claim 2, wherein
the first anode region is part of a first anode and the second anode region is part of a second anode, and
the first anode and the second anode are thermally decoupled.

15. The X-ray source of claim 14, wherein
the first anode and the first grid-switched cathode are arranged inside a first evacuated X-ray tube housing of the X-ray source,
the second anode and the second grid-switched cathode are arranged inside a second evacuated X-ray tube housing of the X-ray source, and
a vacuum of the first evacuated X-ray tube housing and a vacuum of the second evacuated X-ray tube housing are separated from each other.

16. The X-ray source of claim 2, wherein
the grid voltage unit has a grid voltage source for generating the first grid voltage and the second grid voltage and a grid voltage switch, and
the grid voltage switch is embodied to transfer the grid voltages between the first grid and the second grid by switching the grid voltage switch.

17. The X-ray source of claim 16, wherein the grid voltage unit comprises:
a first grid voltage source configured to generate the first grid voltage; and
a second grid voltage source configured to generate the second grid voltage such that the first grid voltage is regulated independently of the second grid voltage.

18. The X-ray source as claimed in claim 17, wherein the second grid-switched cathode is configured to expand the second current of emitted electrons as a function of the second grid voltage.

19. The X-ray source of claim 2, wherein the grid voltage unit is configured to ascertain an amplitude of the second current of emitted electrons and to regulate the first grid voltage and the second grid voltage as a function of the ascertained amplitude.

20. The X-ray source of claim 2, wherein the grid voltage unit is configured to regulate the first grid voltage and the second grid voltage as a function of a change over time in the high voltage.

* * * * *